United States Patent [19]

Kettle, Jr.

[11] Patent Number: 5,538,331

[45] Date of Patent: Jul. 23, 1996

[54] APPLICATIONS OF EPIC® 3102 BRAKE EQUIPMENT TO ELECTRO-PNEUMATIC SYSTEMS

[75] Inventor: Paul J. Kettle, Jr., Pittsburgh, Pa.

[73] Assignee: Westinghouse Air Brake Company, Wilmerding, Pa.

[21] Appl. No.: 380,023

[22] Filed: Jan. 30, 1995

[51] Int. Cl.⁶ ............................................. B60T 15/14
[52] U.S. Cl. ...................................... 303/15; 303/20
[58] Field of Search ........................ 303/7, 9, 15, 8, 303/20, 16, 17, 18, 3, 81, 86, 33, 36, 38, 25; 364/426.01; 246/182 B, 182 R

[56] References Cited

U.S. PATENT DOCUMENTS 4,904,027  2/1990  Skantar et al. .
5,192,118  3/1993  Balukin et al. .
5,222,788  6/1993  Dimsa et al. .
5,419,620  5/1995  Rasti .......................................... 303/20

*Primary Examiner*—Douglas C. Butler
*Attorney, Agent, or Firm*—James Ray & Associates

[57] ABSTRACT

An electro-pneumatic railroad braking system is provided which uses a digital computer to provide enhanced performance and flexibility. The computer makes it possible to eliminate microswitches and other equipment used in present systems. Compatibility is provided for several different electro-pneumatic braking systems by providing routines in the computer for each of the alternative braking systems, and selecting the routine to be used when the locomotive or other vehicle carrying the system is coupled to a train of other vehicles.

22 Claims, 2 Drawing Sheets

APPLICATIONS OF EPIC® 3102 BRAKE EQUIPMENT TO ELECTRO-PNEUMATIC SYSTEMS

CROSS REFERENCE TO RELATED APPLICATIONS

The invention taught in this patent application is related to the inventions taught in the following co-pending patent applications:

Digital Output Control Device and Method for Operating (application Ser. No. 08/340,235, filed Nov. 16, 1994); Method And Apparatus for Feedback of Trainline Status To The Central Processor of A Locomotive Throttle Controller (application Ser. No. 08/340,239, filed Nov. 16, 1994); An Apparatus For And A Method of Generating An Analog Signal For Control Of Dynamic Braking (application Ser. No. 08/340,742, filed Nov. 16, 1994); An Apparatus For Feedback Of An Analog Signal Used To Monitor and/or Control Dynamic Braking And Method Of Operating (application Ser. No. 08/340,232, filed Nov. 16, 1994); Apparatus For Determining The Absolute Position of Throttle, Dynamic Brake And Reverser Handles On A Locomotive Control Stand (application Ser. No. 08/340,526, filed Nov. 16, 1994).

Each of the above-referenced patent applications has been filed on Nov. 16, 1994, and has been assigned to the assignee of this invention. Additionally, the teachings of each of these patent applications is incorporated herein by reference thereto. Teachings in these patent applications may be useful to a person skilled in the art for implementing the present invention.

FIELD OF THE INVENTION

This invention applies to the field of railway braking systems. It applies more particularly to railway airbrake systems which, in addition to the brake airline, have electric lines connected down the length of the train, to carry signals which provide improved control of braking.

BACKGROUND OF THE INVENTION

In the classical railroad air brake system, as developed from the Westinghouse air brake, the brake air line which passes from the locomotive and then from car to car down the length of the train, provides two basic functions.

First, it is used to charge compressed air tanks in the railroad cars. The air stored in these tanks provides the energy needed to apply the brake shoes when a brake application is required. When the train is running normally, and no brake application is needed, a high pressure, typically 90 pounds for freight trains and 110 pounds for passenger trains, exists in the brake air line. The tanks in the cars are charged to the same pressure as the air in the brake air line.

Second, when a brake application is required, some of the air is vented from the valve in the locomotive which supplies the brake air line, causing the pressure in the brake air line to be reduced. In the cars of the train, this reduction of pressure is used as a signal to apply the brakes. In this event, valving in the cars utilizes the compressed air in the tanks to supply air to brake cylinders which apply force to the brake shoes so that the brakes are applied.

Although this classical air brake system was an enormous improvement over the art prior to it, it nevertheless had some features where improvement was possible. For one thing, the time needed for a pressure decrement to propagate down the line of cars in a long freight train is quite long, about a minute for a mile-long train. Hence, when a brake application is required, it takes some time before all the brakes in the train are applied. This is the case for both normal and emergency brake applications.

There are also some operational difficulties due to the fact that the same compressed air line is used both for charging the air tanks in the cars, and for signalling brake application. When a brake application is made, some of the air in the air tanks is depleted. At the same time, the pressure in the brake air line is reduced to signal the brake application. The air in the air tanks cannot be recharged to its initial pressure while the brake line air pressure is low for applying brakes.

One approach to alleviating these problems is to provide a radio link so that when a signal originates in a lead locomotive to apply brakes, a radio signal is transmitted which is received at some distance down the line of cars. Where the signal is received, it causes local venting of the brake line, so that brakes are applied more rapidly. The WABCO EPIC brake system may be operated with a radio link for this purpose. (Registered trademark of Westinghouse Airbrake Company)

Another approach which is embodied in several systems which are incompatible with each other, but in which each is compatible with the classical air brake system, is to provide electrical trainlines, which are electric cables connected from car to car down the length of the train. These are provided in addition to the classical air line. These cables carry signals which control the operation of various air valves in the cars. These provide improved speed of response, and provide various operational improvements.

Several systems employ three electrical trainlines, but use them in different ways. These lines are identified as the application line, the release line, and the emergency line. Three systems, each using three such lines, are discussed here. These are the WABCO MC30A/CS-1, the WABCO 26-C/CS-2, and the New York Air Brake system, the NYAB PS-68.

In all three systems, the signals on the lines are, at any time, on or off, these being referred to as digital signals. In all three systems, a signal on the application line causes an immediate normal brake application in all the cars, or an immediate increase of application of brakes in all the cars. In all three systems, a signal on the emergency line causes air to be dumped rapidly from the brakeline in all the cars to provide an immediate emergency brake application.

The release line is used differently in the different systems. In the CS1 system, a signal on the release line causes high pressure air to be admitted to the brake line causing a graduated release of the brakes. In the CS2 system, a signal on the release line prevents release of air from the brake cylinders in the cars so the brake line pressure can be increased without releasing the brakes.

In the CS1 system, high pressure air for increasing the brake line pressure in the cars of the train is obtained from a second line which carries compressed air down the length of the train.

In the CS1 system, braking forces can be modulated on and off (within certain limits) by modulating the brakeline pressure. The air tanks in the cars are kept charged by the second compressed air line, and the amount of brake application is proportional to the decrement in brakeline pressure compared to the pressure in a reference reservoir.

The CS1 system has, in the locomotive, an added system which has a diaphragm which makes a comparison between a pressure defined by the position of the brake control lever, and the pressure in the brake line in the locomotive. Motion of the diaphragm in either direction is detected by one of two microswitches, one of which controls a signal applied to the application trainline, and one of which controls a signal applied to the release trainline.

These signals are used, in the cars of the train, to adjust the brakeline pressure so it follows the pressure established by the position of the brake control lever. A signal on the application trainline causes a release of air pressure at a known rate from the brake line in all the cars. This causes application of brakes, or causes increased application of brakes. A signal on the release line causes air to flow at a known rate from the second compressed air line in each of the cars to the brake line to release or cause a reduction of the forces on the brake shoes.

In all of these systems, compatibility is maintained with the classical airbrake system to the extent that braking function is provided by the classical air brake line and the braking equipment in the cars. Hence, a car equipped with one of these systems can be included in a train not so equipped, so it can be taken to a customer location, to a repair shop, etc.

The various systems which use electrical trainlines to provide enhanced braking function, however, are incompatible with each other. This is one disadvantage of the systems described above. A locomotive equipped for one system cannot provide the appropriate electrical signals to a train of cars equipped with a different system. Another disadvantage of the above systems is the use of microswitches which in some systems are used to determine the position of the brake lever, or, in the CS1 system, are used to provide trainline signals based on diaphragm position.

An additional disadvantage of the these systems is that in some cases, a brake application may be made which is so small that when a release signal is given, the brakes do not release.

The present invention addresses these and other disadvantages of the systems described above, while utilizing much of the rolling stock equipped with these systems.

SUMMARY OF THE INVENTION

The classical railroad airbrake system is improved by the addition of one or more electrical trainlines connected from car to car down the length of the train. Signals originating in the lever or other means which controls the brakes are read by a computer, and signals are generated for transmission on the trainline(s). These signals, which travel at electrical speeds down the length of the train can be used to control air valves in the cars to improve the function of the airbrake system. More rapid response may be provided by the use of electrical signals, and various options in the control of the brakes become possible when computer-generated electrical signals are available, in addition to the usual signals conveyed by brakeline air pressure.

OBJECTS OF THE INVENTION

The principal object of the present invention is to provide an improved system for providing electrical signals on the electrical trainlines of electro-pneumatic brake systems. It is an object to provide apparatus in which a digital computer generates signals which are subsequently converted in solid-state relays into robust electrical signals on the trainlines.

It is an object to provide an apparatus which can drive trains equipped with several different electro-pneumatic systems by software changes in the computer. Hence, a locomotive, or other railway vehicle equipped with the present invention can be used to provide electro-pneumatic braking on trains equipped with a variety of electro-pneumatic braking systems.

It is a further object to eliminate bulky and unreliable electrical equipment, such as microswitches. In some of the electro-pneumatic braking systems, microswitches responsive to the position of the brake valve handle are used to control electrical signals applied to the trainlines. Such microswitches are eliminated in the present invention which uses optical encoders, read by a computer, to determine the position of the brake valve handle. This capability is presently available in the EPIC 3102 braking system. (EPIC is a trademark of Westinghouse Air Brake Co.) The present system uses the EPIC system, or future systems with at least the same capabilities as EPIC.

In one of the current systems, microswitches are used in a pressure-regulating function. The WABCO MC30A/CS-1 system has a pressure regulator with a diaphragm. On one side of the diaphragm is air at a pressure defined by the position of the brake handle. On the other side of the diaphragm is a sample of the brake line pressure. If these pressures differ, microswitches are closed which place signals on the trainlines. These signals control valves in the cars of the train to either increase or decrease the brake line pressure to follow the pressure defined by the position of the brake handle.

This function, which in the CS-1 system involves a considerable amount of equipment, is replaced in the present invention by calculating a numeric value for the desired pressure in a computer, based on the computer-read indication of brake lever position. A numeric value for the brake line pressure is then obtained using an analog-to-digital conversion. The difference between these is then obtained by subtraction in the computer, and the difference is used as a basis for signals applied to the trainlines.

It is a further object to accommodate future electro-pneumatic braking systems having improved performance and fewer system-induced peculiarities. A future system, for example, might resemble the CS-1 system in that brake application can be adjusted up and down by adjusting brake line pressure in the reverse direction. One improvement over the CS-1 system could be to transmit a numeric value for the desired brakeline pressure on the trainlines, and sense and adjust the brakeline pressure locally in each vehicle of the train.

Likewise, a future system could transmit a numeric value for the reference pressure used as a reference for pressure decrements which cause brake application. With this improvement, an engineer would be able to adjust the brake application up and down, as needed, without causing a change in the reference pressure.

A further object of the present invention is to provide, in software, means for preventing very light brake applications, or very small releases of the brakes which would tend to cause the brake shoes to stick, rather than release, when the signal is given to release.

A further object of the present invention is to permit modifications of the system to be made in software to meet future requirements.

In addition to the above described objects and advantages of the present invention, other objects and advantages of the invention will become readily apparent to persons skilled in the art of railway electro-pneumatic braking systems, after reading the description which follows, and the claims.

BRIEF DESCRIPTION OF THE INVENTION AND PREFERRED EMBODIMENTS

Figure 1:
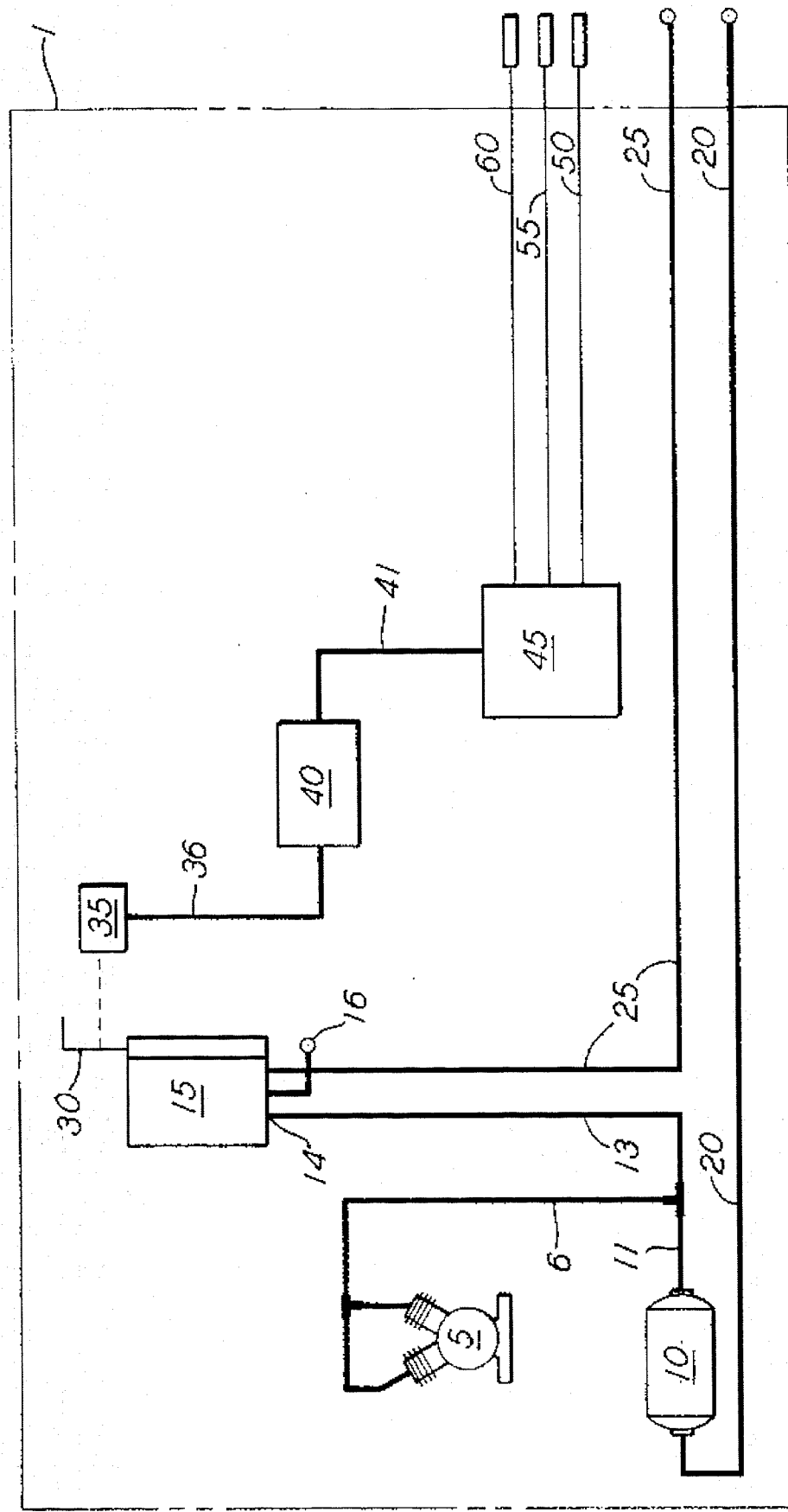
FIG. 1 shows a schematic of those portions of the present invention located in the railway vehicle which supplies the braking signals on the pneumatic airline and the electrical trainlines.

In FIG. 1, 5 is an air compressor which supplies reservoir 10 through air lines 6 and 11. These are located in railway vehicle 1, which may be a locomotive. Brake control lever 30 provides signals through a communication means 17 to valve 15. Air is supplied to an inlet port 14 of valve 15 through air lines 11 and 13.

Valve 15 controls pressure of the first pneumatic brakeline 25. This is the brake line of the classical air brake system. In response to the brake control lever 30, when a pressure increase in brakeline 25 is required, air is admitted from the inlet port 14 to the brakeline 25. When a pressure reduction is needed in brakeline 25, valve 15 exhausts air through vent 16.

In some embodiments of this invention, a second pneumatic airline 20 is provided. Air in this line is always at a high pressure, obtained from reservoir 10 through air line 11.

The position of brake control lever 30, in addition to controlling the air valve 15 and hence the first pneumatic brakeline 25, also is read by an optical encoder 35 connected by communication line 36 to a digital computer 40. For current applications, 40 is a computer in the EPIC 3102 brake system. (EPIC is a registered trademark of Westinghouse Airbrake Company.) Signals responsive to the brake lever position from computer 40 go by communication line 41 to an output driver 45, which supplies robust signals to trainlines 50, 55, and 60, which are connected to other vehicles of the train. Robust signals are provided by solid state relays (not shown) in the output driver 45. Not shown is a voltage reference cable, which carries the battery negative voltage (essentially a ground voltage). This cable passes with the trainlines 50, 55, and 60 to the adjacent railway vehicle, and provides voltage reference for the trainlines 50, 55, and 60.

Figure 2:
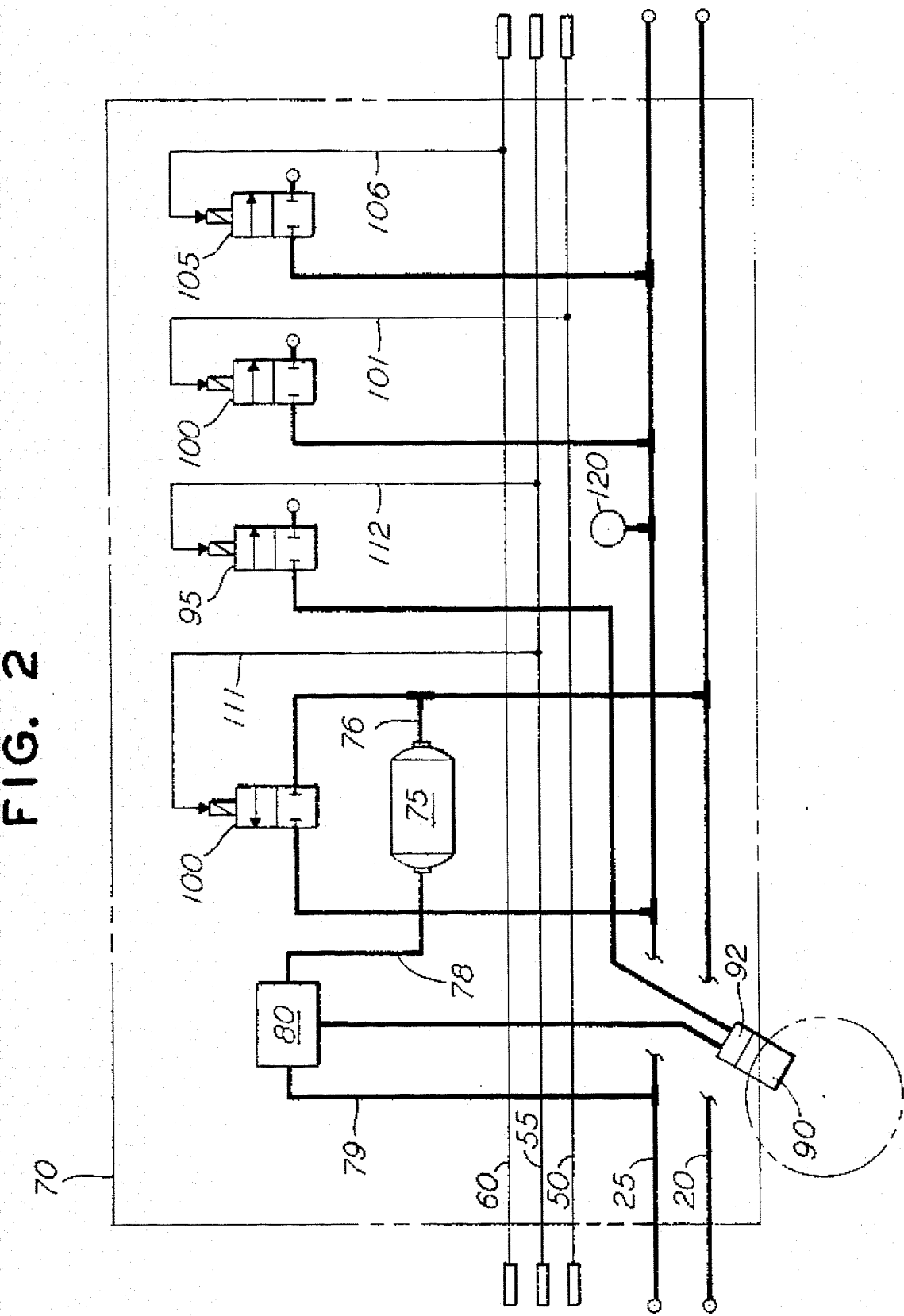
FIG. 2 shows a schematic of those portions of the present invention located in a railway vehicle other than the vehicle which supplies the braking signals.

A second railway vehicle 70 is shown in FIG. 2. As before, 25 is the first pneumatic brakeline of the classical air brake system. The second pneumatic brakeline 20 supplies charging air to air tank 75 through air conduit 76. To apply brakes, air is admitted to the brake cylinder 92 through valve 80, using air from reservoir 75 supplied through air line 78. Admission of air to brake cylinder 92 is controlled by the pressure changes occurring in the first pneumatic brakeline 25, which supplies air to valve 80 through air line 79.

In this figure, 50 is the application trainline, 55 is the release trainline, and 60 is the emergency trainline.

In some embodiments, a signal on application trainline 50 provides a signal through line 101 to valve 100 causing it to vent air from the first pneumatic brakeline 25 at a controlled rate. This is done to provide brake application at a controlled rate.

In some embodiments, a signal on the release trainline 55 sends a signal through line 111 to valve 110, which admits air from the second (high pressure) pneumatic brakeline 20 to the first pneumatic brakeline 25, thus releasing the brakes.

In other embodiments, a signal on the release trainline 55 sends a signal through line 112 to valve 95 to cause venting of air from brake cylinder 92.

In most embodiments, a signal on the emergency trainline 60 sends a signal through line 106 to air dump valve 105 to dump air very quickly from the first pneumatic brakeline 20, and hence cause an emergency application of the airbrakes.

In a future version, a pressure sensor 120 may be provided to measure the pressure of air in the first pneumatic airline. This pressure would be compared with a numeric pressure value transmitted on one of the trainlines shown, or on an additional trainline, not shown.

In its most general aspect, this invention consists of the classical railroad airbrake system with certain computer-based electrical enhancements. The classical system utilizes a pneumatic brakeline connected between the locomotive and the cars of the train to provide a continuous pneumatic conduit connecting all the cars. In the locomotive, an air compressor supplies air to a reservoir, and an air valve supplies this air at a controlled pressure to the pneumatic brakeline. This valve is controlled by signals from the air brake control lever. This valve also provides for venting air to reduce the pressure in the pneumatic brakepipe, to apply brakes throughout the train.

In the cars of the train, air tanks are provided. These are charged with compressed air through the pneumatic brakeline prior to operation of the train. The energy stored in these tanks supplies the energy for brake application subsequently.

The need for brake application is signalled by a reduction in pressure of the pneumatic brakeline. Whenever the brakeline pressure is not reduced, the air tanks in the cars are recharged.

Brakes in the cars are applied by pneumatic brake cylinders. Valving admits air to these cylinders from the air tanks when a drop in pressure of the pneumatic brake line signals a need for brakes.

Following the prior art of electro-pneumatic brake systems, at least one electrical trainline is connected from the locomotive, or other vehicle from which the braking functions are controlled. Signals on these trainlines provide enhanced performance of the airbrake system.

Departing from the prior art, the present invention has a computer which provides signals to an output driver stage which places signals on the trainlines. Enhanced flexibility is provided by the computer, and some reductions of hardware requirements are possible.

This invention provides for rapid brake application throughout the train. The computer, reading the brake control lever position, and determining that a need for brake application exists, may send a signal on one of the trainlines, which causes valves 100 to open in all the cars of the train, to reduce the pressure of the pneumatic brakeline and cause rapid but controlled application of brakes.

In response to the brake control lever being in an emergency position, the computer may send a signal on one of the trainlines which causes valves 105 to open in all the cars of the train, to reduce the pressure of the pneumatic brakeline very quickly, and cause an emergency application of the brakes.

The present invention may be used in a variety of electro-pneumatic systems. A signal sent on one of the trainlines may signal valves 95 in the cars of the train to retain wheel pressure in the event that the pressure of the pneumatic brakeline is increased, while brake application is still needed. This makes it possible to recharge the reservoirs 75 in the cars of the train while a brake application remains in effect.

In a further aspect, the invention may employ a second pneumatic brakeline connecting the cars of the train. This second brakeline carries air at high pressure which is not reduced for signalling the need for brake application. The air tanks may then be charged by air from this second pneumatic brakeline, even when the pressure in the first pneumatic brakeline is reduced to signal a need for brake application. Valving may provide for the tanks to be supplied from whichever pneumatic brakeline has the higher pressure. This is so that a car so equipped can be connected to a train having only one pneumatic brakeline, and still have compressed air in the tanks for braking.

In a further aspect, the invention provides a system in which the computer may make a comparison between a calculated pressure for the first pneumatic airline based on the position of the brake control lever, and the actual pressure, measured at the supply valve 15. The computer then generates signals which are impressed on trainlines 50 and 55 to control valves in the car which adjust the pressure of the pneumatic brakeline 25. A signal on the application trainline 50 causes air to be vented through valve 100 to reduce the pneumatic brakeline pressure. A signal on the release trainline 55 causes valve 110 to open, admitting air from the second (high pressure) pneumatic brakeline. This makes it possible (within certain limits) for the engineer or other operator to vary the brake application up and down as needed.

In a more advanced future system, the computer would generate signals which would be placed on the trainlines which indicate numerical values for pressure. Pressure sensors would then be provided in all the cars of the train. In each car, valves would adjust the pressure of the pneumatic brakeline by tapping air from the second pneumatic brakeline, or venting to atmosphere, depending upon the local brakeline pressure compared with the numerical value indicated by the trainline signals.

The signal indicating this pressure value may be an analog signal, such as the voltage on a trainline which can have a range of voltage values, depending on the pressure calculated in the computer.

The signal indicating this pressure may also be a digital signal consisting of pulses disposed sequentially in time. One method of doing this would be to transmit binary information by long and short pulses interspersed with long or short intervals between pulses. Another method would to use the fraction of the time that a pulse is on compared to the fraction of the time that is between pulses. Digital signals may also be sent in parallel, using a plurality of trainlines.

In another embodiment, two trainlines are provided. A signal on one of these causes rapid application of brakes in a controlled fashion. A signal on the other causes air to be dumped through dump valves in the cars of the train. This provides emergency brake application at a rapid rate.

In another embodiment, three trainlines are provided. Signals on one trainline cause application of brakes. Signals on a second trainline causes emergency application of brakes, and signals on a third trainline control release and holding of the brakes.

The brakes may be controlled by a brake application control lever, or by some other man-machine device. A knob with a pointer mounted over a scale on an instrument panel would be another possibility.

By means of the computer, it is possible for a locomotive or other railway vehicle to control electro-pneumatic brakes of several different systems. Hence, if this invention is provided in the vehicle which provides the electrical and pneumatic signals, existing trains having the various different system can be operated using the locomotive or other vehicle equipped with the present invention.

Routines can be supplied in software in the computer to provide electro-pneumatic control for the WABCO MC30A/CS1 system, the WABCO 26-C/CS-2 system, or the New York Air Brake system, NYAB PS-68. Changes easily made in software can also accommodate future electro-pneumatic braking systems.

Routines can be supplied in the software to provide desirable controls of the signal. For example, software may prevent the application of brakes below a certain threshold signal. This may be done to prevent sticking of the brakes. Likewise, software may prohibit very slight releases of brake application, which may also cause sticking.

In a further aspect, the system provides trainline signals without employing microswitches. Trainline signals are generated in solid state relays which provide robust electrical signals. These signals are based on signals generated in the computer.

PRESENTLY PREFERRED EMBODIMENT

For the near future, the most preferred embodiment is one which employs three trainlines, each of which carries on/off signals. These lines are the application line, the release line and the emergency line. The locomotive has two pneumatic brakelines, a first pneumatic brakeline which, when its pressure drops, causes brake application, and a second brakeline which always has a high pressure and is used in the cars of the train for release of brakes, or for charging the air tanks in the cars. The latter brakeline is only connected if the train the locomotive is connected to requires the second pneumatic brakeline.

In this preferred embodiment, the computer is programmed with three sets of routines, to emulate either the WABCO MC30A/CS-1 system, the WABCO 26-C/CS2 system, or the NYAB PS-68 system.

When emulating any of these systems, microswitches are eliminated. The position of the brake application control member is read by the computer using optical encoders. Likewise, the diaphragm sensor with microswitches presently used for the CS-1 system is replaced. This is done by taking an analog signal for the pressure in the first brakeline and converting it into a digital signal in an analog-to-digital converter. In the computer, this is subtracted from a pressure value calculated from the position of the control member. The numerical value of the difference is used to provide signals to the application line or the release line, as needed, to adjust the pressure of the first brakeline throughout the train.

While a number of embodiments of the invention have been discussed above, it should be obvious to persons who are skilled in the art of electro-pneumatic railroad braking systems that this invention has application to many different configurations, some to be developed in the future. The scope of the invention is therefore not limited to the preceding discussion, but rather should be taken from the following claims.

I claim:

1. An electro-pneumatic railroad brake system for controlling brake application on a train consisting of a plurality of coupled railway vehicles, said electro-pneumatic system being compatible with the industry standard air brake system, said electro-pneumatic system comprising:

(a) a first pneumatic brakeline on each of such railway vehicles connected between vehicles to provide a continuous pneumatic conduit connecting all of such vehicles, said first pneumatic brakeline having a local brakeline pressure in each of such vehicles;

(b) a compressor, reservoir, air valve, air vent and a brake application control member having an adjustable position in one of such vehicles for supplying air of controlled, adjustable pressure to said first pneumatic brakeline;

(c) a plurality of air tanks, at least one in each of such railway vehicles, for storing energy for brake application, said plurality of air tanks being charged with compressed air through said first pneumatic brakeline prior to operation of said train, and being recharged with compressed air to remain fully charged whenever brake application is not required;

(d) a plurality of brakes in each of such railway vehicles, each brake being applied by a brake cylinder having relatively moveable parts for applying force to at least one brake shoe in response to compressed air admitted to said brake cylinder;

(e) a plurality of brake cylinder valves in each car, said brake cylinder valves responding to a reduction of said local brakeline pressure by admitting air from said at least one air tank to at least one said brake cylinder for applying force to said at least one brake shoe;

(f) at least one electrical trainline on each vehicle connected between vehicles to provide at least one electrical communication line connecting all of such vehicles;

(g) a computer disposed on a first one of such railway vehicles, said computer having means for reading said adjustable position of said brake application control member and generating at least one signal responsive to said position;

(h) means for applying at least one electrical signal to said at least one electrical trainline based on said at least one signal responsive to said adjustable position of said brake application control member;

(i) means responsive to said at least one electrical signal disposed in such railway vehicles for controlling a plurality of air valves in such railway vehicles for providing enhanced performance of said railroad brake system.

2. The electro-pneumatic railroad brake system of claim 1 wherein said at least one electrical signal on said at least one electrical trainline is a signal indicative of a command for controlled application of said plurality of brakes, and said plurality of air valves serve to reduce said local brakeline pressure locally in each of said railway vehicles simultaneously, at a known rate to expedite said controlled application of said plurality of brakes.

3. The electro-pneumatic railroad brake system of claim 1 wherein said at least one electrical signal on said at least one electrical trainline is a signal indicative of a command for emergency application of said plurality of brakes, and said plurality of air valves serve to reduce said local brakeline pressure locally in each of said railway vehicles at a rapid rate to expedite said emergency application of said plurality of brakes.

4. The electro-pneumatic railroad brake system of claim 1 wherein said at least one electrical signal on said at least one electrical trainline is a signal indicative of a command for holding said plurality of brakes, maintaining brake application while said local brakeline pressure in said first pneumatic brakeline in such railway vehicles is increased, and said plurality of air valves serve to retain wheel cylinder pressure while said local brakeline pressure is increased.

5. The electro-pneumatic railroad brake system of claim 1 further comprising:

(j) a second pneumatic brakeline on each vehicle, connected between vehicles to provide a continuous pneumatic conduit connecting all of such vehicles, said second pneumatic brakeline carrying high pressure air not subject to reduction for signalling brake application, said plurality of air tanks being charged by air from said second pneumatic brakeline.

6. The electro-pneumatic railroad brake system of claim 1 further comprising:

(j) a second pneumatic brakeline on each vehicle, connected between vehicles to provide a continuous pneumatic conduit connecting all of such vehicles, said second pneumatic brakeline carrying high pressure air not subject to reduction for signalling brake application, said local brakeline pressure of said first pneumatic brakeline being regulated in such railway vehicles to correspond to said adjustable position of said brake application control member based on charging signals and pressure reduction signals carried on said at least one electrical trainline; said charging signals causing valves to open to admit air from said second pneumatic brakeline to said first pneumatic brakeline, and said pressure reduction signals causing valves to open to purge air from said first pneumatic brakeline; said charging signals and said pressure reduction signals being activated by signals generated in said computer in response to said adjustable position of said brake application control member.

7. The electro-pneumatic railroad brake system of claim 1 wherein said signal generated by said computer and said electrical signal applied to said at least one electrical trainline are signals indicative of pressure, said system further comprising:

(j) a second pneumatic brakeline on each vehicle, connected between vehicles to provide a continuous pneumatic conduit connecting all of such vehicles, said second pneumatic brakeline carrying high pressure air not subject to reduction for signalling brake application;

(k) a plurality of pressure sensors in a plurality of such railway vehicles for measuring said local brakeline pressure of said first pneumatic brakeline;

(l) means disposed in each of such plurality of such railway vehicles for comparing the pressure indicated by said electrical signal applied to said at least one electrical trainline with said local brakeline pressure and, based on said comparison, controlling valves to adjust said local brakeline pressure of said first pneumatic brakeline using high pressure air from said second pneumatic brakeline and exhausting to atmosphere, as needed, to cause said local brakeline pressure to be adjusted towards said pressure indicated by said signal applied to said at least one electrical trainline.

8. The electro-pneumatic railroad brake system of claim 7 wherein said electrical signal applied to said at least one electrical trainline is an analog signal indicative of pressure.

9. The electro-pneumatic railroad brake system of claim 8 wherein said analog signal indicative of pressure is an analog voltage signal, and wherein said voltage indicates said pressure.

10. The electro-pneumatic brake system of claim 7 wherein said electrical signal applied to said at least one electrical trainline is a digital signal comprising information pulses disposed sequentially in time.

11. The electro-pneumatic brake system of claim 7 wherein said electrical signal applied to said at least one electrical trainline is a digital signal comprising information pulses disposed on a plurality of said electrical trainlines.

12. The electro-pneumatic brake system of claim 1 wherein said at least one electrical trainline comprises two trainlines, a first trainline for signalling a controlled application of said plurality of brakes by venting air from said first pneumatic brakeline to reduce said local brakeline pressure at a known rate, and a second trainline for signalling an emergency application of said plurality of brakes by venting air from said first pneumatic brakeline to reduce said local brakeline pressure at a rapid rate to expedite said emergency application of said plurality of brakes.

13. The electro-pneumatic brake system of claim 1 wherein said at least one electrical trainline comprises three trainlines, a first trainline for signalling a controlled application of said plurality of brakes by venting air from said first pneumatic brakeline to reduce said local brakeline pressure at a known rate, a second trainline for signalling an emergency application of said plurality of brakes by venting air from said first pneumatic brakeline to reduce said local brakeline pressure at a rapid rate to expedite said emergency application of said plurality of brakes, and a third trainline for providing signals controlling release and holding of said plurality of brakes.

14. The electro-pneumatic brake system of claim 1 wherein said brake application control member is a control lever and wherein said adjustable position is an angular position.

15. The electro-pneumatic brake system of claim 1 wherein said computer is programmed with a plurality of routines to accommodate a plurality of electro-pneumatic braking systems so that said first one of such railway vehicles having said computer disposed thereon may be coupled to and provide braking control to a plurality of pluralities of coupled railway vehicles characterized by having a plurality of electro-pneumatic braking systems.

16. The electro-pneumatic brake system of claim 15 wherein said plurality of electro-pneumatic braking systems includes the WABCO MC30A/CS-1 electro-pneumatic braking system.

17. The electro-pneumatic brake system of claim 15 wherein said plurality of electro-pneumatic braking systems includes the WABCO 26-C/CS-2 electro-pneumatic braking system.

18. The electro-pneumatic brake system of claim 15 wherein said plurality of electro-pneumatic braking systems includes the NYAB PS-68 electro-pneumatic braking system.

19. The electro-pneumatic brake system of claim 1 wherein said computer is included in the WABCO EPIC 3102 BRAKE EQUIPMENT, EPIC being a registered trademark of Westinghouse Airbrake Company.

20. The electro-pneumatic brake system of claim 1 wherein software in said computer prevents brake application below a threshold such that sticking of brakes would occur if brakes were applied below said threshold.

21. The electro-pneumatic brake system of claim 1 wherein software in said computer prevents brake release in a manner which would cause sticking of brakes.

22. The electro-pneumatic brake system of claim 1 wherein said means for applying at least one electrical signal to said at least one electrical trainline comprises at least one solid state relay driver.

* * * * *

UNITED STATES PATENT AND TRADEMARK OFFICE
CERTIFICATE OF CORRECTION

PATENT NO. : 5,538,331
DATED : July 23, 1996
INVENTOR(S) : Paul J. Kettle, Jr.

It is certified that error appears in the above-indentified patent and that said Letters Patent is hereby corrected as shown below:

Column 10, line 8, delete "(j)" and insert --(a)--;

column 10, line 17, delete "(j)" and insert --(a)--;

column 10, line 41, delete "(j)" and insert --(a)--;

column 10, line 47, delete "(k)" and insert --(b)--;

column 10, line 50, delete "(l)" and insert --(c)--.

Signed and Sealed this

Twenty-second Day of October, 1996

Attest:

BRUCE LEHMAN

Attesting Officer     Commissioner of Patents and Trademarks